United States Patent
Onishi et al.

(10) Patent No.: US 10,524,187 B2
(45) Date of Patent: Dec. 31, 2019

(54) WIRELESS COMMUNICATION APPARATUS AND WIRELESS COMMUNICATION METHOD USING WIRELESS LAN CLIENT

(71) Applicant: TOYOTA JIDOSHA KABUSHIKI KAISHA, Toyota-shi, Aichi-ken (JP)

(72) Inventors: Ryokichi Onishi, Tokyo (JP); Masaaki Sasahara, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 15/426,190

(22) Filed: Feb. 7, 2017

(65) Prior Publication Data

US 2017/0289752 A1    Oct. 5, 2017

(30) Foreign Application Priority Data

Mar. 30, 2016  (JP) ................................ 2016-069255

(51) Int. Cl.
*H04W 4/00*     (2018.01)
*H04W 40/20*    (2009.01)
(Continued)

(52) U.S. Cl.
CPC ........... *H04W 40/20* (2013.01); *H04W 76/10* (2018.02); *H04W 84/12* (2013.01); *H04W 84/18* (2013.01)

(58) Field of Classification Search
CPC ....... H04W 4/02; H04W 76/10; H04W 40/20; H04W 84/12; H04W 84/18
See application file for complete search history.

(56) References Cited

U.S. PATENT DOCUMENTS 7,885,285 B2   2/2011  Fukuyama
8,351,417 B2   1/2013  Chen et al.
(Continued)

FOREIGN PATENT DOCUMENTS

CN    101132308 A    2/2008
CN    105684508 A    6/2016
(Continued)

OTHER PUBLICATIONS

Ismail (data collection in vehicular networks, 2007, Ismail salhi) (Year: 2007).*

(Continued)

*Primary Examiner* — Maharishi V Khirodhar
(74) *Attorney, Agent, or Firm* — Oliff PLC

(57) ABSTRACT

An apparatus which transfers information transmitted from a master node or addressed to the master node, comprises a generation unit that generates an assessment value representing logical proximity to the master node; a transmit unit that sends/receives the assessment value to/from other apparatuses; and a communication unit that, when this apparatus is an apparatus that is logically closest to the master node within a communication range, transmit information having the master node as a transmission source to other apparatuses or receive information addressed to the master node from the other apparatuses; otherwise, transmit information addressed to the master node to the logically closest apparatus or receive information having the master node as a transmission source from the logically closest apparatus.

8 Claims, 12 Drawing Sheets

(51) Int. Cl.
*H04W 76/10* (2018.01)
*H04W 84/12* (2009.01)
*H04W 84/18* (2009.01)

(56) References Cited

U.S. PATENT DOCUMENTS

| | | |
|---|---|---|
| 8,359,002 B2 | 1/2013 | Morris |
| 8,406,248 B2 | 3/2013 | Pratt, Jr. et al. |
| 8,493,981 B2 | 7/2013 | Yousefi et al. |
| 8,578,054 B2 | 11/2013 | Thubert et al. |
| 8,582,579 B2 | 11/2013 | Yousefi et al. |
| 8,675,629 B2 | 3/2014 | Yi et al. |
| 8,718,055 B2 | 5/2014 | Vasseur et al. |
| 9,014,190 B2 | 4/2015 | Nguyen et al. |
| 9,014,954 B2 | 4/2015 | Sato |
| 9,124,482 B2 | 9/2015 | Vasseur et al. |
| 9,237,505 B2 | 1/2016 | Munari et al. |
| 9,276,801 B2 | 3/2016 | Yousefi et al. |
| 9,361,802 B2 | 6/2016 | Milne et al. |
| 9,449,515 B2 | 9/2016 | Rubin et al. |
| 9,531,635 B2 | 12/2016 | Vasseur et al. |
| 9,608,912 B2 | 3/2017 | Thubert et al. |
| 9,723,457 B2 | 8/2017 | Brahmi et al. |
| 9,832,706 B2 | 11/2017 | Miranda d'Orey et al. |
| 9,936,367 B2 | 4/2018 | Schwartz et al. |
| 2007/0008150 A1* | 1/2007 | Hassell .......... A01K 11/006 340/573.1 |
| 2007/0030857 A1* | 2/2007 | Fulknier .......... H04L 45/00 370/401 |
| 2007/0115868 A1 | 5/2007 | Chen et al. |
| 2008/0049657 A1 | 2/2008 | Feng et al. |
| 2008/0095163 A1 | 4/2008 | Chen et al. |
| 2009/0010205 A1 | 1/2009 | Pratt, Jr. et al. |
| 2009/0228575 A1 | 9/2009 | Thubert et al. |
| 2009/0285197 A1 | 11/2009 | Chen et al. |
| 2010/0060480 A1 | 3/2010 | Bai et al. |
| 2010/0080168 A1* | 4/2010 | Fukuyama .......... H04L 45/121 370/328 |
| 2010/0158021 A1 | 6/2010 | Kliger et al. |
| 2010/0214934 A1 | 8/2010 | Conan et al. |
| 2010/0250346 A1 | 9/2010 | Bai et al. |
| 2011/0134762 A1 | 6/2011 | Chen et al. |
| 2012/0106447 A1 | 5/2012 | Yousefi et al. |
| 2012/0106526 A1 | 5/2012 | Yousefi et al. |
| 2012/0108163 A1 | 5/2012 | Bai et al. |
| 2012/0327918 A1 | 12/2012 | Yi et al. |
| 2013/0022042 A1 | 1/2013 | Vasseur et al. |
| 2013/0099941 A1 | 4/2013 | Jana et al. |
| 2013/0142059 A1 | 6/2013 | Di Girolamo et al. |
| 2013/0144516 A1 | 6/2013 | Sato |
| 2013/0188513 A1 | 7/2013 | Vasseur et al. |
| 2013/0279500 A1 | 10/2013 | Youseti et al. |
| 2013/0282263 A1 | 10/2013 | Tee |
| 2014/0068105 A1 | 3/2014 | Thubert et al. |
| 2014/0269766 A1 | 9/2014 | Gopalasetty et al. |
| 2014/0328240 A1 | 11/2014 | Munari et al. |
| 2015/0065148 A1* | 3/2015 | De Pasquale ....... H04W 4/08 455/445 |
| 2015/0081201 A1 | 3/2015 | Rubin et al. |
| 2015/0237040 A1 | 8/2015 | Levin |
| 2015/0296019 A1 | 10/2015 | Onishi et al. |
| 2015/0312945 A1* | 10/2015 | Park .......... H04W 12/04 370/338 |
| 2015/0334031 A1 | 11/2015 | Vasseur et al. |
| 2016/0019788 A1 | 1/2016 | Milne et al. |
| 2016/0135242 A1* | 5/2016 | Hampel .......... H04W 40/02 370/329 |
| 2016/0183176 A1* | 6/2016 | Lee .......... H04W 76/14 455/434 |
| 2016/0212596 A1 | 7/2016 | Brahmi et al. |
| 2016/0270118 A1 | 9/2016 | He et al. |
| 2017/0076331 A1 | 3/2017 | Lei et al. |
| 2017/0215123 A1 | 7/2017 | Miranda d'Orey et al. |
| 2017/0245122 A1* | 8/2017 | Yasuda .......... H04L 67/104 |
| 2017/0245197 A1 | 8/2017 | Onishi et al. |
| 2017/0265018 A1* | 9/2017 | Mok .......... H04W 4/70 |
| 2017/0265046 A1* | 9/2017 | Chen .......... H04W 4/08 |
| 2017/0289896 A1 | 10/2017 | Onishi et al. |
| 2018/0033303 A1 | 2/2018 | Park et al. |
| 2018/0054773 A1 | 2/2018 | Miranda d'Orey et al. |
| 2018/0076839 A1 | 3/2018 | Baghel et al. |
| 2018/0096602 A1 | 4/2018 | She et al. |

FOREIGN PATENT DOCUMENTS

| | | |
|---|---|---|
| EP | 2283585 A1 | 2/2011 |
| EP | 2557892 A1 | 2/2013 |
| EP | 2975592 A1 | 1/2016 |
| EP | 3042524 A1 | 7/2016 |
| EP | 3226647 A1 | 10/2017 |
| JP | 2008-027011 A | 2/2008 |
| JP | 2009-217371 A | 9/2009 |
| JP | 2010-166150 A | 7/2010 |
| JP | 2012-503449 A | 2/2012 |
| JP | 2013-516912 A | 5/2013 |
| JP | 2014-096630 A | 5/2014 |
| JP | 2015-046887 A | 3/2015 |
| JP | 2017184051 A | 10/2017 |
| WO | 2008051264 A1 | 5/2008 |
| WO | 2009140180 A1 | 11/2009 |
| WO | 2010/033919 A2 | 3/2010 |
| WO | 2011/085073 A1 | 7/2011 |
| WO | 2011133016 A2 | 10/2011 |
| WO | 2013/118129 A1 | 8/2013 |
| WO | 2014/073148 A1 | 5/2014 |
| WO | 2015017483 A1 | 2/2015 |
| WO | 2015032436 A1 | 3/2015 |
| WO | 2017/027355 A1 | 2/2017 |
| WO | 2017123500 A1 | 7/2017 |
| WO | 2017134605 A1 | 8/2017 |
| WO | 2017197393 A1 | 11/2017 |

OTHER PUBLICATIONS

Ismail (data collection in vehicular networks, 2007, Ismail salhi) (Year: 2007) (Year: 2007).*
May 3, 2018 Office Action issued in U.S. Appl. No. 15/470,160.
Brad Karp et al., "GPSR: Greedy Perimeter Stateless Routing for Wireless Networks", Proceedings of the Sixth Annual ACM/IEEE International Conference on Mobile Computing and Networking, Aug. 1, 2000, pp. 243-254.
Mar. 21, 2019 Notice of Allowance issued in U.S. Appl. No. 15/470,160.
Liu et al., A survey on position-based routing for vehicular ad hoc networks, May 2016, Telecommun. Syst. 62, May 1, 2016, 15-30, DOI=http://dx.doi.org/10.1007/s11235-015-9979-7, pp. 15-30 (Year 2016).
Zhao et al., VADD: Vehicle-Assisted Data Delivery in Vehicular Ad Hoc Networks, May 16, 2008, IEEE Transactions on Vehicular Technology, vol. 57, Issue 3, pp. 1910-1922 (Year: 2008).
Wu et al., MDDV: A Mobility-Centric Data Dissemination Algorithm for Vehicular Networks, Oct. 1, 2004, VANET 04 Proceedings of the 1st ACM International Workshop on Vehicular Ad Hoc Networks, (Year 2004).
Kumar et al., Route lifetime based optimal hop selection in VANETs on highway: an analytical viewpoint, May 19, 2006, Networking'06 Proceedings of the 5th international IFIP-TC6 conference on Networking Technologies, Services, and Protocols; pp. 799-814 (Year 2006).
Lochert et al., A routing strategy for vehicular ad hoc networks in city environments, Jun. 11, 2003, IEEE IV2003 Intelligent Vehicles Symposium. Proceedings, DOI=https:/Idoi.org/10.1109/IVS.2003. 1212901 (Year 2003).
Tee et al., Survey of position based routing for Inter Vehicle Communication system, Oct. 22, 2008, 2008 First International Conference on Distributed Framework and Applications, DOI= https:/ldoi.org/10.1109/ICDFMA.2008.4784433 (Year 2008).
Xian et al., An enhanced greedy perimeter stateless routing algorithm for wireless sensor network, May 29, 2016, 2016 IEEE

(56) References Cited

OTHER PUBLICATIONS

International Conference of Online Analysis and Computing Science (ICOACS), DOI=https://doi.org10.1109/ICOACS 2016.7563075 (Year 2016).
Nov. 8, 2018 Office Action issued in U.S. Appl. No. 15/470,160.

* cited by examiner

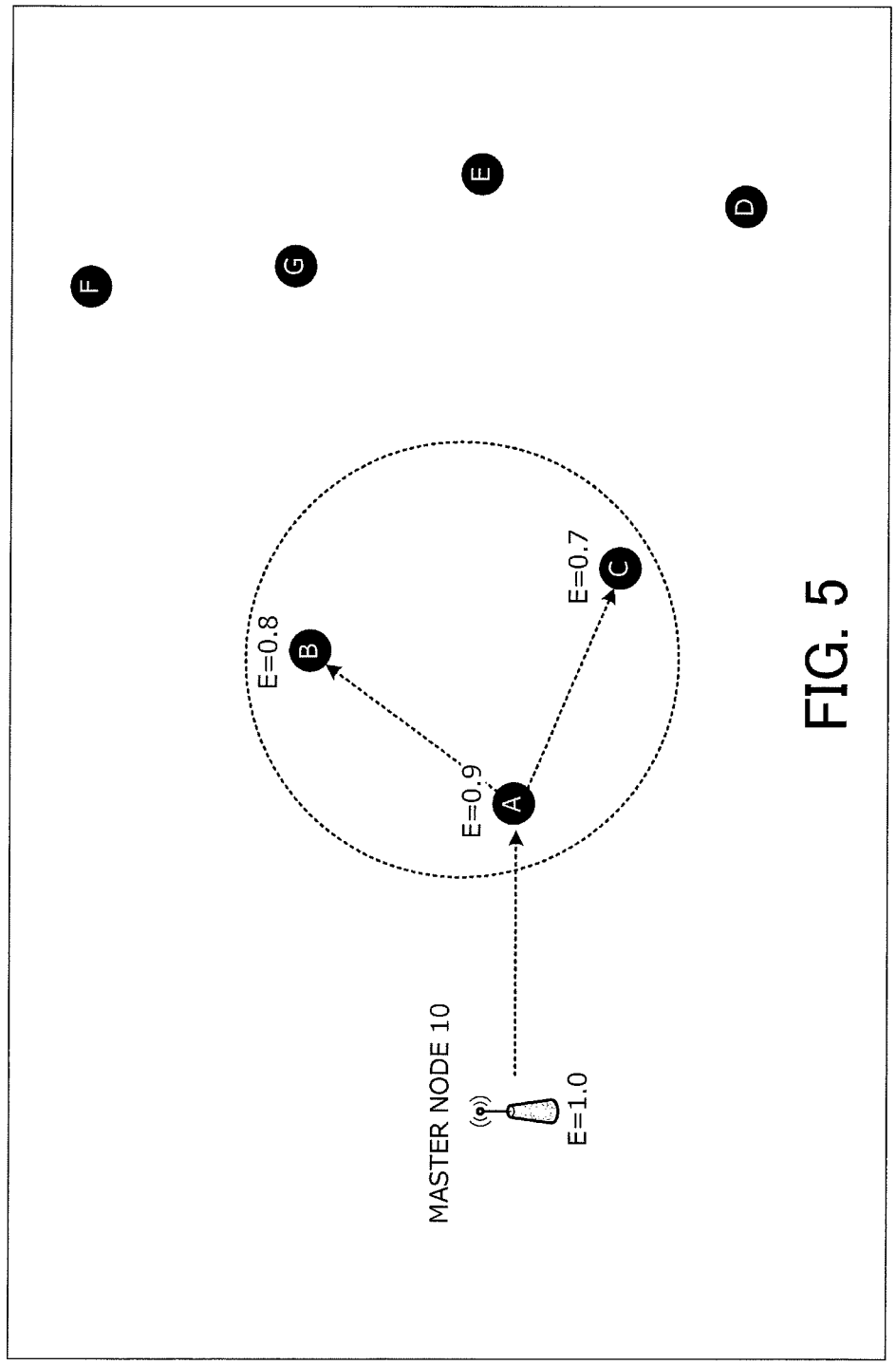

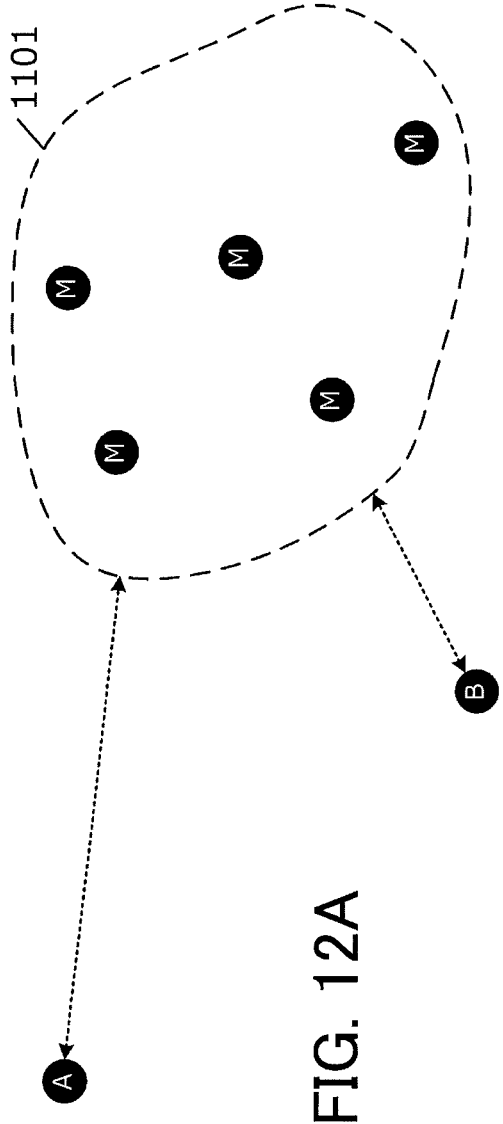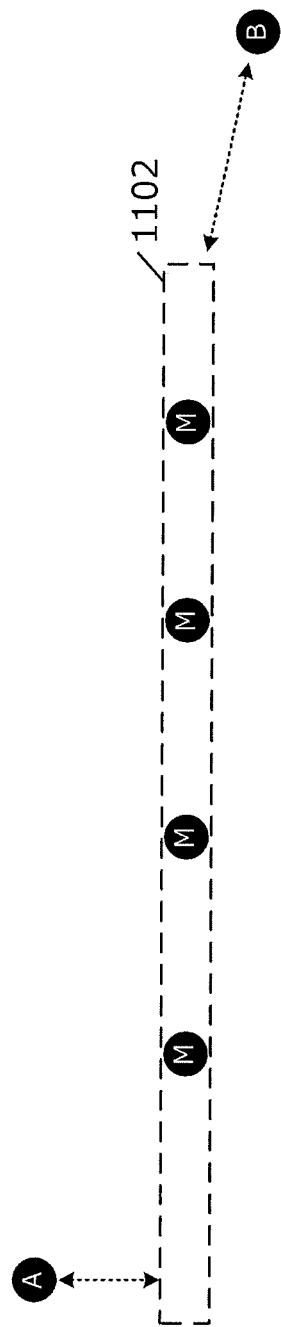
FIG. 12A
FIG. 12B

WIRELESS COMMUNICATION APPARATUS AND WIRELESS COMMUNICATION METHOD USING WIRELESS LAN CLIENT

CROSS REFERENCE TO RELATED APPLICATION

This application claims the benefit of Japanese Patent Application No. 2016-069255, filed on Mar. 30, 2016, which is hereby incorporated by reference herein in its entirety.

BACKGROUND OF THE INVENTION

Field of the Invention

The present invention relates to a wireless communication apparatus and a wireless communication method.

Description of the Related Art

Recently, the collection and use of data from traveling vehicles are being studied. For example, by collecting current positions and speed information from a plurality of vehicles, traffic congestion information can be generated in real time. In addition, smoother traffic can be facilitated by analyzing, from various angles, the data collected from the vehicles.

Inter-vehicle communication can be used to collect data from vehicles. For example, vehicles transfer data to each other using a relatively inexpensive communication apparatus such as a wireless LAN, and a vehicle capable of connecting to a wide area network such as the Internet uploads the pieces of data on behalf of the other vehicles.

Forming such a network not only enables data generated by each vehicle to be transmitted to the wide area network but also enables information transmitted from the wide area network to be shared among a plurality of vehicles (Japanese Patent Application Laid-open No. 2014-096630).

SUMMARY OF THE INVENTION

According to the system described in Japanese Patent Application Laid-open No. 2014-096630, data collected by each vehicle can be communicated to an access point by having communication apparatuses respectively mounted on vehicles relay information. In addition, by reversing the direction of the information, a plurality of vehicles can share the same information.

However, the system described above does not take into consideration points such as to which vehicle information is to be transferred next by a vehicle-mounted communication apparatus transmitting information in order to collect or disseminate information in a more efficient manner. In other words, there is room for improvement in the information communication efficiency.

Moreover, it may seem that a communication route of information can be generated by performing dynamic routing. However, in a network in which a traveling vehicle constitutes anode, since a position of the node constantly changes, a validity period of routing information is extremely short. In other words, performing routing by having nodes exchange route information is unrealistic.

The present invention has been made in consideration of the problems described above and an object thereof is to improve the information communication efficiency in a system which collects or disseminates information using a plurality of wireless communication apparatuses.

The wireless communication apparatus according to the present invention is a wireless communication apparatus which transfers information transmitted from a master node or information addressed to the master node.

The present invention can be applied to a network which disseminates information transmitted from a master node or which gathers information to the master node. In the present specification, a side that is logically close to the master node will be referred to as an upstream side and an opposite side thereof will be referred to as a downstream side. Specifically, in a mode of disseminating information, a relay of information is performed from a wireless communication apparatus positioned on the upstream side to a wireless communication apparatus positioned on the downstream side, and in a mode of collecting information, a relay of information is performed from a wireless communication apparatus positioned on the downstream side to a wireless communication apparatus positioned on the upstream side.

The present invention in its one aspect provides a wireless communication apparatus which transfers information transmitted from a master node or information addressed to the master node, the wireless communication apparatus comprising an assessment value generation unit configured to generate an assessment value representing logical proximity to the master node; an assessment value transmission and reception unit configured to transmit the generated assessment value to one or more other wireless communication apparatuses and receive assessment values from the one or more other wireless communication apparatuses by wireless communication; and a communication unit configured to when this wireless communication apparatus is a wireless communication apparatus that is logically closest to the master node among wireless communication apparatuses within a communication-enabled range, transmit information having the master node as a transmission source to other wireless communication apparatuses or receive information addressed to the master node from the other wireless communication apparatuses, and when a wireless communication apparatus that is logically closest to the master node is present other than this wireless communication apparatus among the wireless communication apparatuses within the communication-enabled range, transmit information addressed to the master node to the logically closest wireless communication apparatus or receive information having the master node as a transmission source from the logically closest wireless communication apparatus.

Since data flows in one direction with reference to the master node in the network that is an application object of the present invention, a wireless communication apparatus which relays information must appropriately determine whether to transmit information in a direction approaching the master node or to transmit information in a direction separating from the master node. In consideration thereof, the wireless communication apparatus according to the present invention calculates an assessment value based on a logical proximity to the master node and switches between transmission and reception operations based on the assessment value.

Being logically close to a master node means that a larger amount of data can be transmitted to and received from the master node in a shorter period of time. For example, while a larger assessment value is calculated in the following cases, assessment value calculation criteria are not limited thereto.

When a distance to the master node is small

When a standby period until communication is enabled with the master node is short When duration of communication with the master node is long When there is a large amount of data that can be transmitted to or received from the master node When the number of hops to the master node is small For example, in order to deliver information collected by a plurality of wireless communication apparatuses to a master node positioned in a given area, a wireless communication apparatus near the area may be given a higher assessment value than a wireless communication apparatus at a distant position from the area.

When entering a communication range of another wireless communication apparatus, the wireless communication apparatus according to the present invention transmits an assessment value thereof and receives an assessment value from the other wireless communication apparatus (hereinafter, the other apparatus). In other words, assessment values are exchanged between wireless communication apparatuses within a communication range. In addition, based on the exchanged assessment values, the wireless communication apparatus determines whether or not the wireless communication apparatus itself is positioned on a most upstream side of the master node among the one or more other apparatuses. Subsequently, based on a determination result, the wireless communication apparatus determines whether to transmit information to the other apparatus or receive information from the other apparatus.

According to the configuration described above, a tree structure can be formed in which information flows from the upstream side to the downstream side and from the downstream side to the upstream side. In other words, in a network formed by a plurality of wireless communication apparatuses, flow of information can be appropriately controlled.

In addition, since each wireless communication apparatus performs transmission and reception of information based solely on assessment values, route information or a routing table for communicating information need not be generated and exchanged. When attempting to use dynamic routing to communicate information, not only must nodes periodically exchange route information and continuously update routing information, there is also a risk that a movement of a node may disable a generated route and interrupt communication. However, in the present invention, since a communication route can be generated by a simple exchange of assessment values by wireless communication apparatuses that are close to each other, highly efficient and highly reliable communication can be performed.

Also, when this wireless communication apparatus is a wireless communication apparatus that is logically closest to the master node among the wireless communication apparatuses within the communication-enabled range, the communication unit may issue a connection request to the other wireless communication apparatuses, and when a wireless communication apparatus that is logically closest to the master node is present other than this wireless communication apparatus among the wireless communication apparatuses within the communication-enabled range, the communication unit may receive a connection request from the logically closest wireless communication apparatus.

A trigger for disseminating or collecting information is issued from a master node. A trigger refers to, for example, a request to disseminate information or a request to collect information. Specifically, a wireless communication apparatus positioned on a most upstream side in a given range must distribute a trigger issued from the master node to wireless communication apparatuses positioned on the downstream side. In consideration thereof, the wireless communication apparatus according to the present invention issues a connection request to other wireless communication apparatuses in a given range when an assessment value of the wireless communication apparatus is the highest in the range, and receives a connection request from another wireless communication apparatus when the assessment value is not the highest. According to this configuration, a connection with a wireless communication apparatus positioned on the downstream side can be established and a connection relationship for efficiently communicating information can be established.

Also, the assessment value may be increased as a time until information transmitted from the master node reaches this wireless communication apparatus or a time until information transmitted from this wireless communication apparatus reaches the master node decreases.

In this manner, the wireless communication apparatus can appropriately determine the position thereof in a tree structure by calculating the assessment value based on the communication time of information between the master node and this wireless communication apparatus.

Also, the wireless communication apparatus may further comprise a positional information acquisition unit configured to acquire a current position, and the assessment value may be determined based on a frequency of communication opportunities between this wireless communication apparatus and the master node, or on a time until the communication opportunity arrives, the frequency and the time being calculated based on the current position.

A node with more opportunities to directly communicate with the master node can be determined as a node positioned on the upstream side. The frequency of communication opportunities or the time until a communication opportunity arrives may be determined based on past information or determined based on a prediction. For example, when a travel route or a destination of a wireless communication apparatus can be acquired, the communication opportunity with the master node can be determined based on these pieces of information. Alternatively, a distance to the master node or a movement direction of the wireless communication apparatus can be used.

Also, the assessment value may be larger when the time until the communication opportunity between this wireless communication apparatus and the master node arrives is short as compared to when the time is long.

The time until the communication opportunity arrives being short means that this wireless communication apparatus should be positioned more to the upstream side in the tree structure. Therefore, the assessment value may be calculated such that the shorter the time, the larger the assessment value.

Also, the assessment value may be larger when the time until the communication opportunity between this wireless communication apparatus and the master node arrives is predicted to subsequently become shorter as compared to when the time is predicted to subsequently become longer.

The time until the communication opportunity arrives subsequently becoming shorter means that this wireless communication apparatus is traveling more to the upstream side in the tree structure. Therefore, when the time is changing in a direction in which the time becomes shorter, the assessment value may be increased (in other words, a determination that the wireless communication apparatus is on the upstream side may be made).

Also, the assessment value generation unit may calculate the assessment value using respectively different criteria in accordance with a type of information to be transferred, and when information of a plurality of types is to be transferred, the assessment value generation unit may make a determination as to the logical proximity to the master node for each type of information to be transferred, by using an assessment value corresponding to the type of the information.

Favorably, assessment value calculation criteria are not uniform and different criteria are used in accordance with properties of information to be communicated. Moreover, when the assessment value changes, relationships with surrounding wireless communication apparatuses also change. Therefore, the position of the wireless communication apparatus may be determined and relationships with surrounding wireless communication apparatuses may be re-generated for each type of information to be communicated.

Moreover, the present invention can be identified as a wireless communication apparatus including at least a part of the units described above. In addition, the present invention can also be identified as a wireless communication method carried out by the wireless communication apparatus. The processes and units described above may be implemented in any combination insofar as technical contradictions do not occur.

According to the present invention, the information communication efficiency can be improved in a system which collects or disseminates information using a plurality of wireless communication apparatuses.

Further features of the present invention will become apparent from the following description of exemplary embodiments with reference to the attached drawings.

BRIEF DESCRIPTION OF THE DRAWINGS

FIG. 5 is a diagram representing a positional relationship between a master node 10 and the wireless communication apparatus 100;

FIGS. 12A and 12B are diagrams showing an example of an area according to a third embodiment.

DESCRIPTION OF THE EMBODIMENTS

First Embodiment

<Outline of System>

Hereinafter, preferred embodiments of the present invention will be described with reference to the drawings.

The present invention can be applied both to a system which distributes information (disseminates information) transmitted from a master node that is an upstream node to a plurality of wireless communication apparatuses that are downstream nodes and to a system which communicates information (collects information) transmitted from a plurality of wireless communication apparatuses to a master node. Among these systems, a first embodiment is an embodiment which distributes information.

Figure 1:
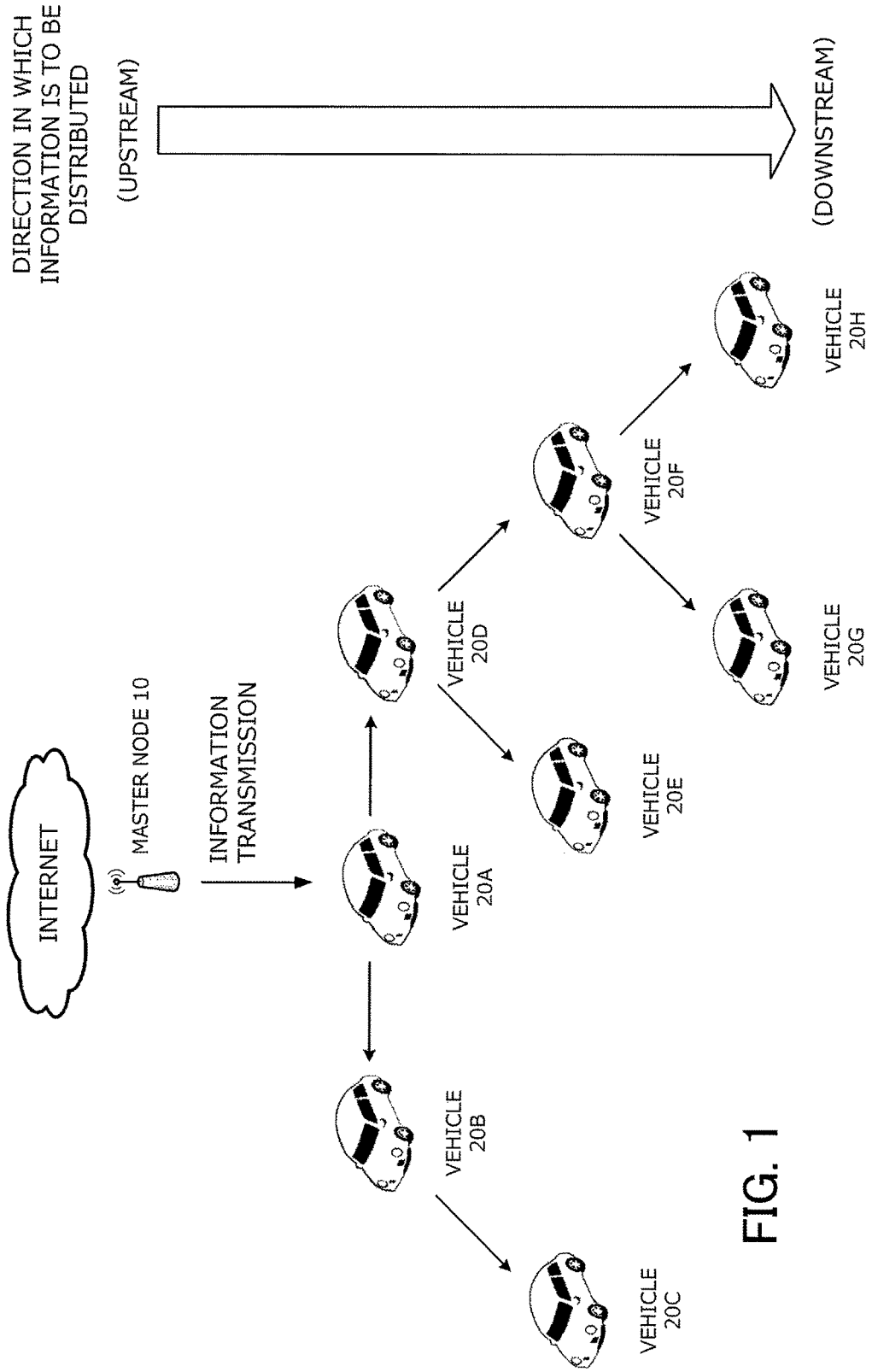
FIG. 1 is a schematic diagram showing an information communication route according to a first embodiment.

A wireless communication system according to the first embodiment is a system which distributes information transmitted from a master node by having a plurality of wireless communication apparatuses mounted on vehicles communicate with each other. FIG. 1 is a schematic diagram showing an information communication route. The wireless communication system according to the present embodiment is constituted by a master node 10 and wireless communication apparatuses mounted on a plurality of vehicles 20A to 20H (when distinctions need not be made, collectively referred to as a vehicle 20). A wireless communication apparatus 100 is an apparatus which performs wireless communication with the master node 10 and other wireless communication apparatuses 100. In addition, the master node 10 is a communication node connected to a wide area network such as the Internet. While the master node 10 is a communication apparatus fixed to the roadside in the present embodiment, the master node 10 may instead be a mobile communication apparatus.

In the first embodiment, as the wireless communication apparatus 100 mounted on the vehicle 20 relays information transmitted from the master node 10 (for example, traffic information), the information is disseminated among the plurality of vehicles 20.

When information is distributed by having the wireless communication apparatuses 100 mounted on the vehicles 20 relay information, which wireless communication apparatus the information is relayed to (in other words, selection of a wireless communication apparatus to be a next hop destination) is important. For example, when desiring to disseminate traffic congestion information regarding a given intersection, information should be transferred in a direction separating from the intersection rather than transferring the information in a direction approaching the intersection.

When simply disseminating information, data may be unconditionally transmitted and received when a plurality of wireless communication apparatuses respectively enter a communication range (so-called flooding). However, with such a method, there is a risk that it may take time for information to reach an area to which the information is to be communicated or that resources end up being wasted due to repetitively receiving information that is already owned.

In consideration thereof, in the wireless communication system according to the present embodiment, communication control is performed such that a direction in which information is to be distributed is defined and each wireless communication apparatus 100 constituting a network distributes information from an upstream side to a downstream side. In the present embodiment, aside that is logically close to a master node (in other words, a side where disseminated information reaches earlier) will be referred to as upstream and a side that is logically further away from the master node (in other words, a side where information reaches later than the upstream side) will be referred to as downstream.

Upstream and downstream are not necessarily related to actual distances from the master node. For example, in order to disseminate information from a given point A to a peripheral area, a hierarchical relationship may be set such that the point A is most upstream. When entering a state where communication can be performed with another wireless communication apparatus, a wireless communication apparatus according to the present embodiment characteristically determines which wireless communication apparatus is to be positioned upstream (downstream) and determines a transmission/reception destination of information based on a determination result.

Examples of information to be distributed from the master node include, but are not limited to, road traffic information (such as traffic congestion information).

<System Configuration>

Figure 2:
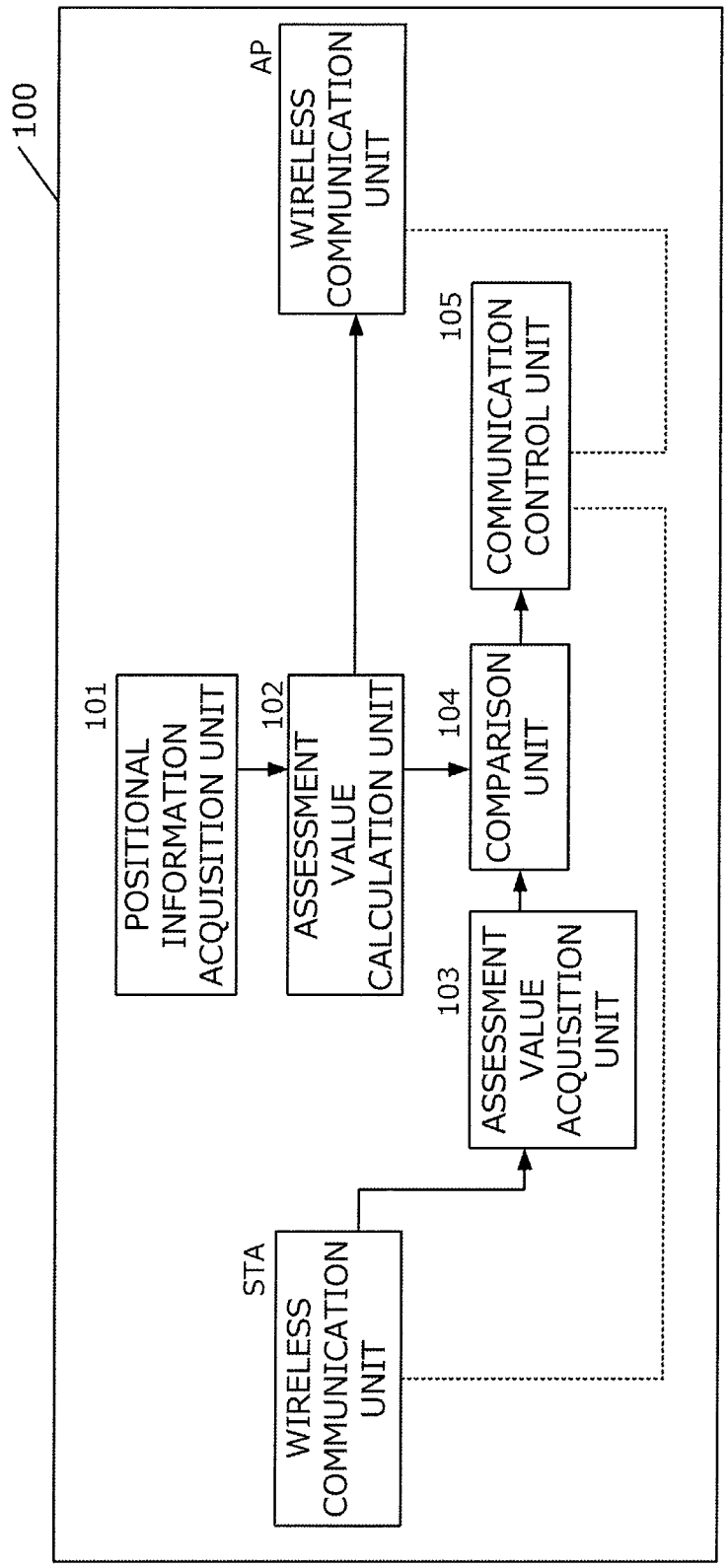
FIG. 2 is a configuration diagram of a wireless communication apparatus 100 according to the first embodiment.

A configuration of the wireless communication apparatus 100 according to the first embodiment will be described with reference to FIG. 2.

The wireless communication apparatus 100 is a communication apparatus to be mounted on the vehicle 20 and includes a wireless communication unit STA, a positional information acquisition unit 101, an assessment value calculation unit 102, an assessment value acquisition unit 103, a comparison unit 104, a communication control unit 105, and a wireless communication unit AP.

The wireless communication apparatus 100 can be configured as an information processing apparatus including a CPU (an arithmetic processing apparatus), a main storage apparatus, and an auxiliary storage apparatus. The respective units illustrated in FIG. 2 function as a program stored in the auxiliary storage apparatus is loaded to the main storage apparatus and executed by the CPU. Alternatively, all of or a part of the illustrated functions may be executed using exclusively designed circuits.

The positional information acquisition unit 101 is a unit which acquires a current position (latitude and longitude) of the wireless communication apparatus 100 from a GPS module (not shown) provided on the apparatus.

The wireless communication units STA and AP are units which include a wireless communication interface and which transmit and receive information by wireless communication. In the present embodiment, the wireless communication units STA and AP perform communication conforming to a wireless LAN (IEEE 802.11) communication system (infrastructure mode).

Specifically, the wireless communication unit STA is a unit which, as a wireless LAN client, transmits and receives information to and from wireless LAN access points such as the master node 10 and the wireless communication unit AP included in other wireless communication apparatuses 100. In addition, the wireless communication unit AP is a unit which, as a wireless LAN access point, transmits and receives information to and from the wireless communication unit STA included in other wireless communication apparatuses 100.

The communication control unit 105 is a unit which controls transfer of information using the wireless communication units STA and AP. Specifically, information transmitted from the master node 10 is received from a wireless communication apparatus positioned on the upstream side (a side closer to the master node 10) (or from the master node itself) and transferred to a wireless communication apparatus positioned on the downstream side (a side further away from the master node). How the wireless communication units STA and AP are used during transfer will be described later.

Contents of processes performed by the other functional blocks will be described later with reference to flow charts.

The master node 10 is a roadside apparatus which transmits information to the vehicle 20. The master node 10 acquires information and transmits information to vehicles via a fixed network such as the Internet or a private network. Examples of information to be transmitted may include traffic information and information that contribute to traffic safety. In addition to transmitting information, the master node 10 has a function of broadcasting an assessment value (to be described later).

<Outline of Processes>

An outline of processes performed by the wireless communication apparatus according to the first embodiment will now be presented.

The wireless communication apparatus according to the present embodiment enables assessment values to be exchanged between wireless communication apparatuses which are respectively positioned within a communication range by periodically calculating an assessment value and broadcasting the calculated assessment value. An assessment value is a value representing a logical proximity to the master node 10 among a plurality of wireless communication apparatuses. A high assessment value means that information transmitted from the master node 10 can be acquired at an earlier stage.

The wireless communication apparatus according to the present embodiment retains criteria (hereinafter, assessment value calculation criteria) for calculating an assessment value in accordance with properties of information to be distributed in the assessment value calculation unit 102. While the assessment value calculation criteria can be defined by, for example, a mathematical expression, the assessment value calculation criteria can also be defined by other means.

For example, the assessment value calculation criteria may be set upon shipment from a factory or may be acquired via a public communication network (for example, a cellular communication network or a public wireless LAN) or broadcast waves.

In addition, assessment value calculation criteria include positional information of a master node.

For example, when information that is a dissemination object has properties of being "transmitted from a master node positioned at point X and disseminated in a direction separating from the master node", assessment value calculation criteria such that "the closer to the point X, the higher the assessment value, and the further away from the point X, the lower the assessment value" is used.

Figure 3:
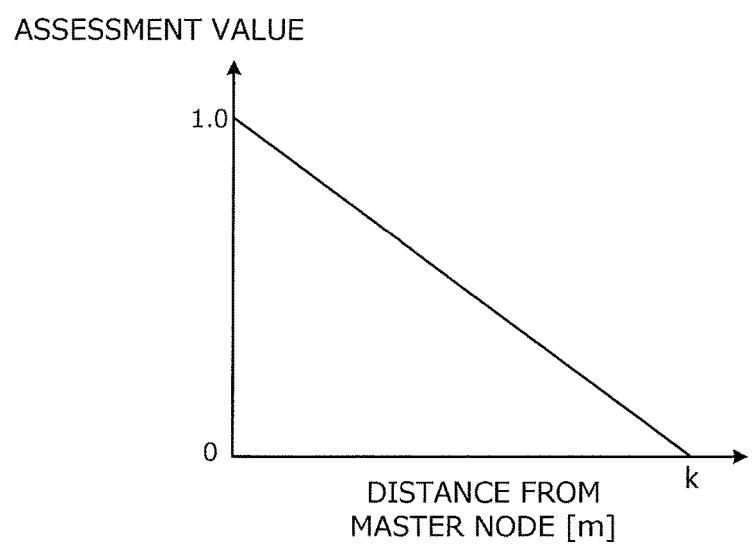
FIG. 3 shows an example of assessment value calculation criteria according to the first embodiment.

FIG. 3 shows an example of assessment value calculation criteria which simply determines an assessment value in accordance with a distance from the master node. In this case, the assessment value of the master node itself is 1.0. In addition, the assessment value at a point separated from the master node by k [m] is 0. In the example shown in FIG. 3, since an assessment value is simply determined in accordance with the distance from the master node, the physically closer to the master node, the higher the assessment value.

Moreover, the example shown in FIG. 3 is merely exemplary and any criteria may be used to calculate an assessment value. For example, when desiring to have information transmitted from the master node reach a point Y, an assessment value may be calculated such that, the closer to point X, the higher the assessment value, and the closer to point Y, the lower the assessment value.

In addition, when desiring to have information disseminated to vehicles on a road that leads to a given intersection, assessment values may be determined in accordance with both a distance from the intersection and a distance from the road.

Next, a method in which the wireless communication apparatus 100 having assessment value calculation criteria communicates information will be described with reference to FIG. 4 which is a flow chart showing processes performed by the wireless communication apparatus 100 and to FIG. 5 which is a diagram representing positions of the master node 10 and vehicles mounted with the wireless communication apparatus 100. In this case, it is assumed that only one type of assessment value calculation criteria shown in FIG. 3 are to be used.

Figure 4:
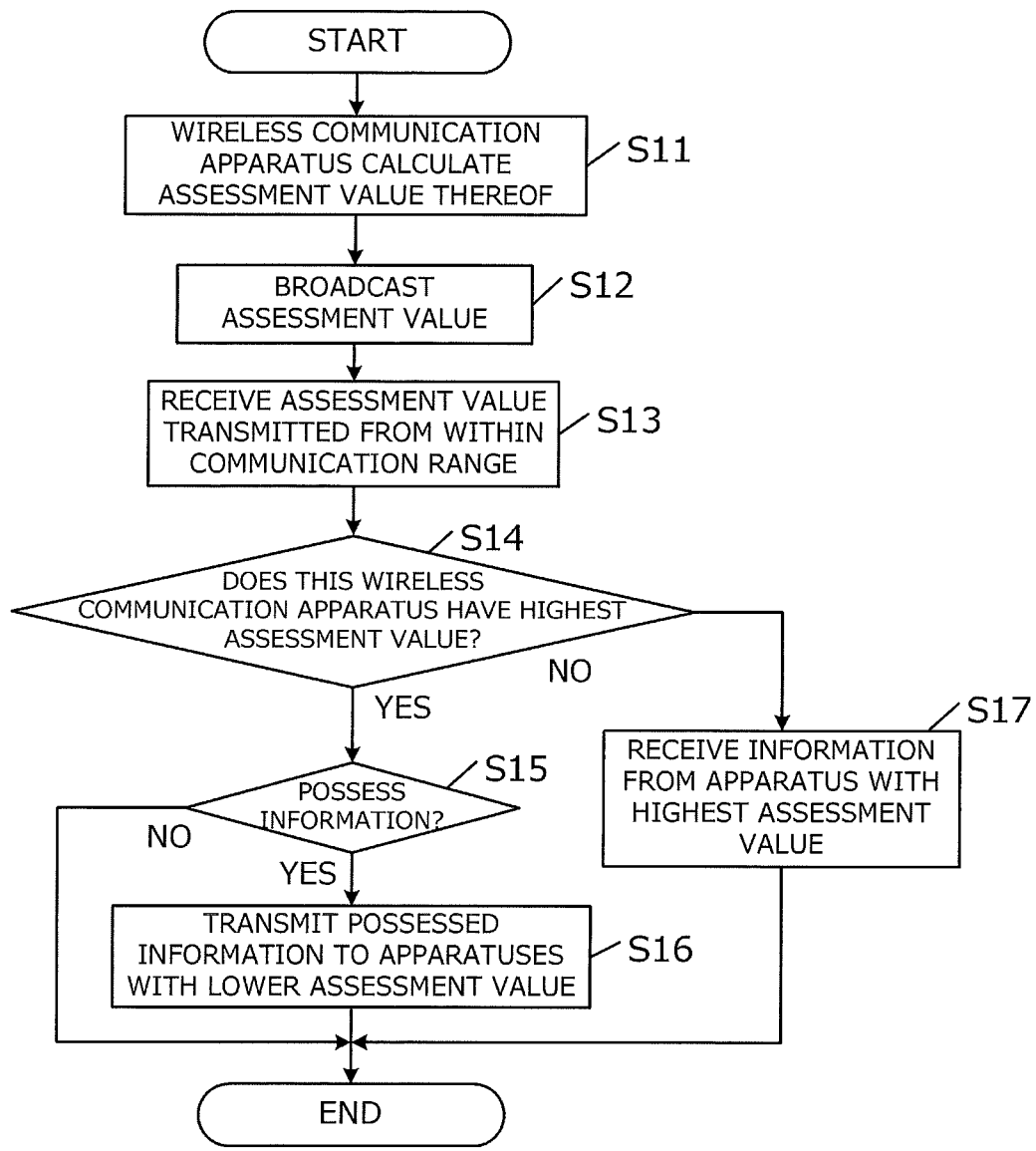
FIG. 4 is a flow chart of processes performed by the wireless communication apparatus 100 according to the first embodiment.

The processes shown in FIG. 4 are periodically executed.

Moreover, in FIG. 5, a circular dotted line represents a set of wireless communication apparatuses that are respectively within a communication range, and A to G are reference characters corresponding to the wireless communication apparatuses 100. Hereinafter, the wireless communication apparatuses A to G may also be simply referred to as apparatuses A to G.

First, in step S11, the positional information acquisition unit 101 acquires a current position of the apparatus and transmits the current position to the assessment value calculation unit 102. Next, the assessment value calculation unit 102 calculates an assessment value using a position of the master node, the current position of the apparatus, and the assessment value calculation criteria. The calculated assessment value is transmitted to the wireless communication unit AP and the comparison unit 104.

Next, in step S12, the wireless communication unit AP broadcasts the assessment value calculated by the assessment value calculation unit 102. Transmission of the assessment value may be performed using, for example, a wireless LAN beacon. For example, the calculated assessment value may be included in an ESSID.

Next, in step S13, the assessment value acquisition unit 103 receives an assessment value transmitted from another apparatus via the wireless communication unit STA. Moreover, steps S12 and S13 need not necessarily be executed in the illustrated order. For example, both steps may be executed in parallel and an advance may be made to a next step once transmission and reception are completed. The assessment value received from the other apparatus is transmitted to the comparison unit 104.

In this case, as shown in FIG. 5, it is assumed that the apparatuses A to C have respectively calculated assessment values (E) of 0.9, 0.8, and 0.7 in accordance with distances from the master node 10. The calculated assessment values are broadcast from the respective wireless communication apparatuses and shared by the other wireless communication apparatuses within the communication range.

Next, in step S14, the comparison unit 104 compares the assessment value calculated by the assessment value calculation unit 102 and the assessment value received from the other apparatus and determines whether or not the assessment value of the apparatus to which the assessment value calculation unit 102 belongs is the highest among the wireless communication apparatuses within the communication range. As a result, when a positive determination is made, it is recognized that the apparatus is positioned most upstream (hereinafter, a first position) within the communication range. In addition, when a negative determination is made, it is recognized that the apparatus is positioned on the downstream side (hereinafter, a second position).

In this case, when focusing attention on the apparatus A, since the assessment value of the apparatus A is the highest among the wireless communication apparatuses within the communication range, the apparatus A recognizes that the apparatus A itself is positioned on the most upstream side. In addition, the apparatuses B and C recognize that the apparatuses B and C themselves are positioned on the downstream side. Determination results are transmitted to the communication control unit 105.

When the apparatus recognizes that the apparatus itself is at the first position (in other words, at an upper position in the tree structure), this apparatus transmits information to a plurality of wireless communication apparatuses at the second position.

In addition, when the apparatus recognizes that the apparatus itself is at the second position (in other words, at a lower position in the tree structure), this apparatus receives information from the wireless communication apparatus at the first position. Information received from the other apparatuses is temporarily stored in a memory (not shown). Hereinafter, "information possessed" means that the information is stored in a memory.

In the present embodiment, an operation is performed in which an apparatus at the first position issues a connection request to an apparatus at the second position and transmits information after the connection is completed.

In step S15, the communication control unit 105 determines whether or not information transmitted from another apparatus (or the master node) is in possession, and if the information is in possession, performs control so that the wireless communication unit STA establishes a wireless connection with the other apparatus, and transmits the information in step S16.

On the other hand, in step S17, the wireless communication unit AP accepts a connection request transmitted from another apparatus (in other words, a wireless communication apparatus with the highest assessment value or the master node) and receives information.

According to steps S15 and S16, information to be disseminated is transmitted from the apparatus at the first position to apparatuses at the second position. In the example shown in FIG. 5, information is transmitted after the wireless communication unit STA included in the apparatus A establishes connections with the wireless communication units AP included in the apparatuses B and C.

Figure 6A:
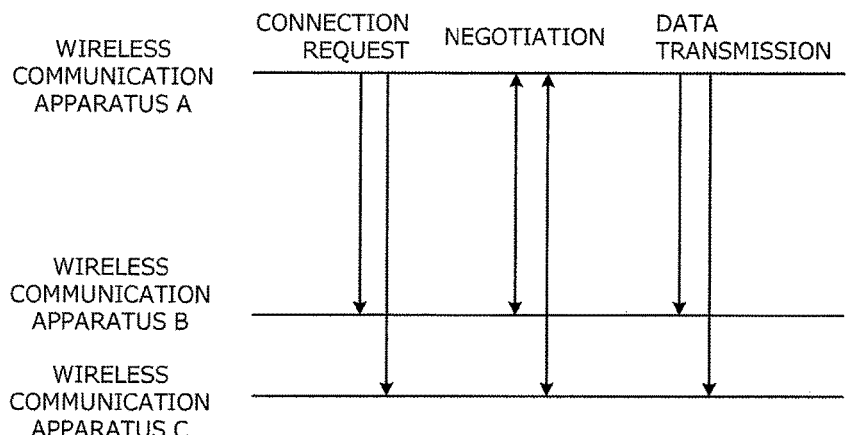
FIGS. 6A and 6B are sequence diagrams showing communication between apparatuses.

FIG. 6A is a sequence diagram showing communication between apparatuses.

First, the apparatus A respectively issues connection requests to the apparatuses B and C and performs negotiation. At this point, the wireless communication unit AP included in the apparatuses B and C operates as a server that accepts the connection request. In addition, the wireless communication unit STA included in the apparatus A operates as a client that issues the connection request.

Once connections are established, the apparatus A respectively transmits information to the apparatuses B and C.

Moreover, in the present example, a side with a higher assessment value is operated as a client and a side with a lower assessment value is operated as a server. This is because an apparatus on the side with the higher assessment value must issue connection requests to a plurality of apparatuses. However, when connections can be established by long polling or the like, the server and the client may be reversed.

Figure 7:
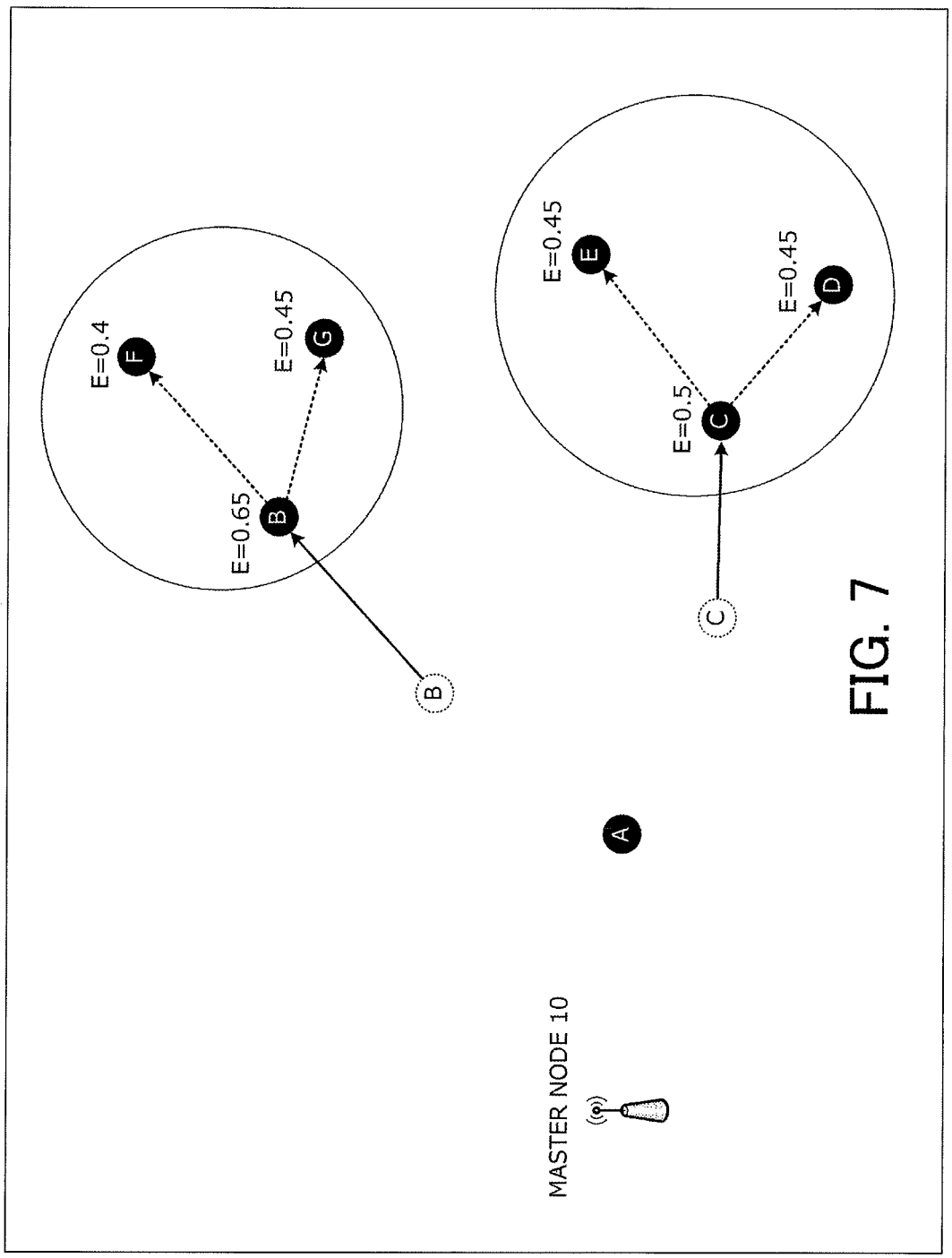
FIG. 7 is a diagram representing a positional relationship between the master node 10 and the wireless communication apparatus 100.

The processes described above are periodically executed. FIG. 7 is a diagram representing positions of vehicles in a cycle following the process shown in FIG. 5. It is assumed that the apparatuses B and C have respectively moved from the positions indicated by white circles to positions indicated by black circles. In this case, the apparatus B enters a state where the apparatus B can communicate with the apparatuses F and G and the apparatus C enters a state where the apparatus C can communicate with the apparatuses D and E.

In this case, the same processes as those described with reference to FIG. 4 are performed. In other words, each apparatus acquires an assessment value and shares the assessment value by broadcast. In the example shown in FIG. 7, an assessment value corresponding to the apparatus B drops to 0.65. On the other hand, since assessment values of the apparatuses F and G are even lower than that of the apparatus B, the apparatuses F and G become acquirers of information. In a similar manner, an assessment value corresponding to the apparatus C drops to 0.5. On the other hand, since assessment values of the apparatuses D and E are even lower than that of the apparatus B, the apparatuses D and E become acquirers of information.

By repetitively performing the processes described above, information is disseminated from an apparatus with a high assessment value to apparatuses with a lower assessment value. In the present embodiment, since an assessment value is determined in accordance with a distance from the master node, information is sequentially transferred in a direction separating from the master node.

Moreover, although not mentioned with reference to FIG. 4, a validity period may be set to information to be transmitted. For example, time information may be set to the information to be transmitted, and transfer of information for which the set time has elapsed may be stopped. Alternatively, transfer may be stopped when an elapsed time from a time of initial transmission exceeds a prescribed time.

In addition, a validity period need not necessarily be in a time format. For example, transfer may be stopped when a distance from the master node equals or exceeds a prescribed distance or transfer may be stopped when reaching a prescribed area. Alternatively, transfer may be stopped when deviating from a prescribed area. In addition, transfer may be stopped when a same wireless communication apparatus travels a prescribed distance or more while possessing same information. Alternatively, transfer may be stopped when the number of hops exceeds a prescribed value.

As described above, a wireless communication apparatus according to the present embodiment repetitively performs a process of exchanging assessment values in a communication-enabled range and transmits or receives information within the range based on the assessment values. As a result, information is gradually disseminated from an apparatus with a high assessment value to apparatuses with a low assessment value. In other words, by appropriately setting assessment value calculation criteria, a dissemination route of information can be controlled without having to perform dynamic routing.

Second Embodiment

While a mode in which information generated by a master node is distributed to a plurality of wireless communication apparatuses has been presented in the first embodiment, a similar concept can be applied to a mode in which information generated by a plurality of wireless communication apparatuses is communicated to a master node (a mode of collecting information).

Figure 8:
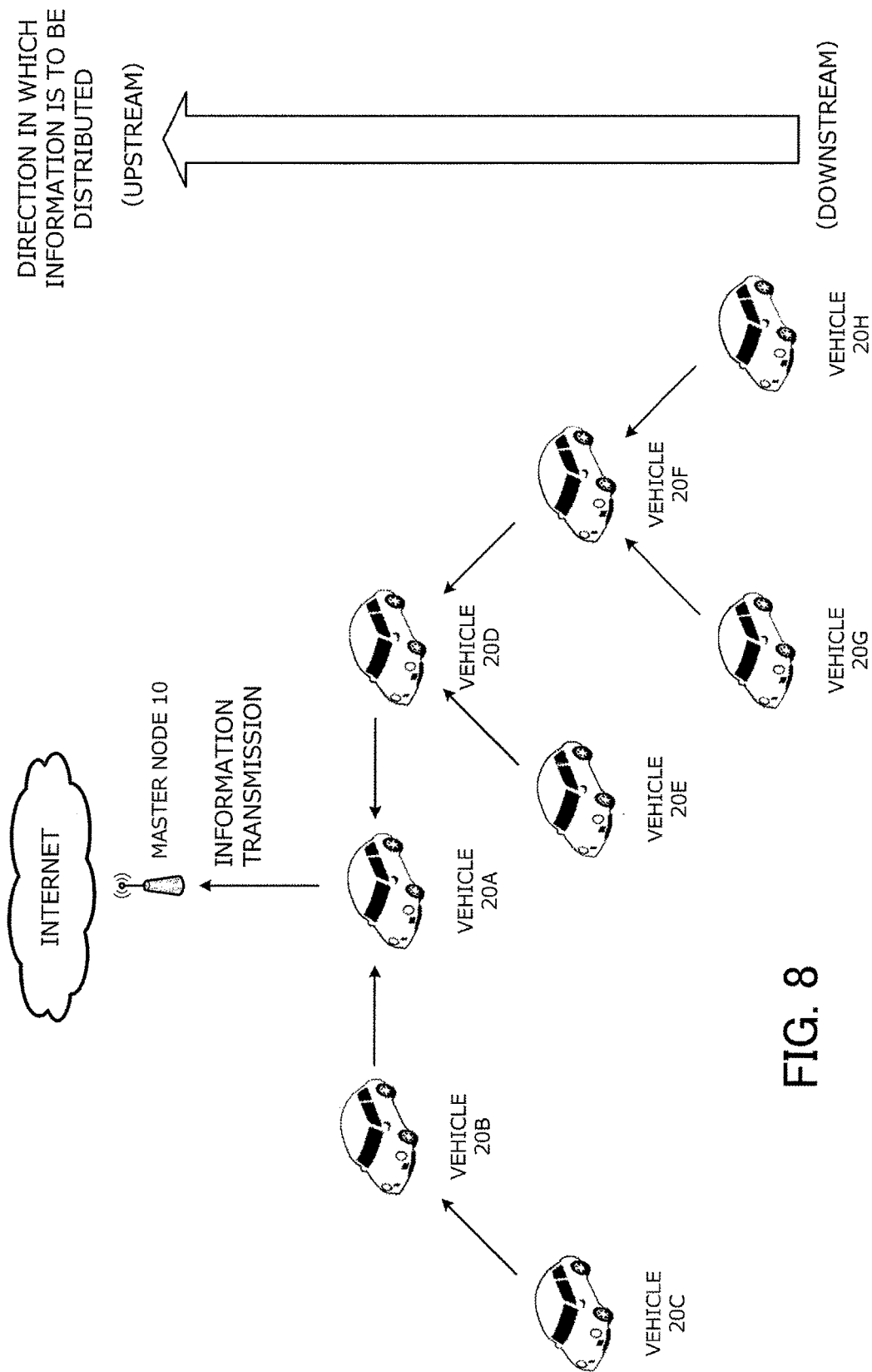
FIG. 8 is a schematic diagram showing an information communication route according to a second embodiment.

A wireless communication system according to a second embodiment is a system which gathers data (for example, sensor information) generated by each vehicle to a master node by having a plurality of wireless communication apparatuses mounted on vehicles communicate with each other. FIG. 8 is a schematic diagram showing an information transmission route. The wireless communication system according to the present embodiment is constituted by a master node 10 and wireless communication apparatuses mounted on a plurality of vehicles 20A to 20H in a similar manner to the first embodiment.

While an assessment value is calculated in the first embodiment such that the logically closer to a transmission source of information, the higher the assessment value, an assessment value is calculated in the second embodiment such that the logically closer to a collection destination of information, the higher the assessment value. The first embodiment and the second embodiment have a common point in that, the logically closer to a master node, the higher the assessment value.

In addition, while a wireless communication apparatus with a high assessment value transmits information to a plurality of wireless communication apparatuses with low assessment values in the first embodiment, in the second embodiment, a wireless communication apparatus with a high assessment value collects information from a plurality of wireless communication apparatuses with low assessment values.

According to this configuration, communication control can be performed such that information is distributed from the downstream side (in other words, a side further away from the master node) toward the upstream side (a side closer to the master node).

Figure 9:
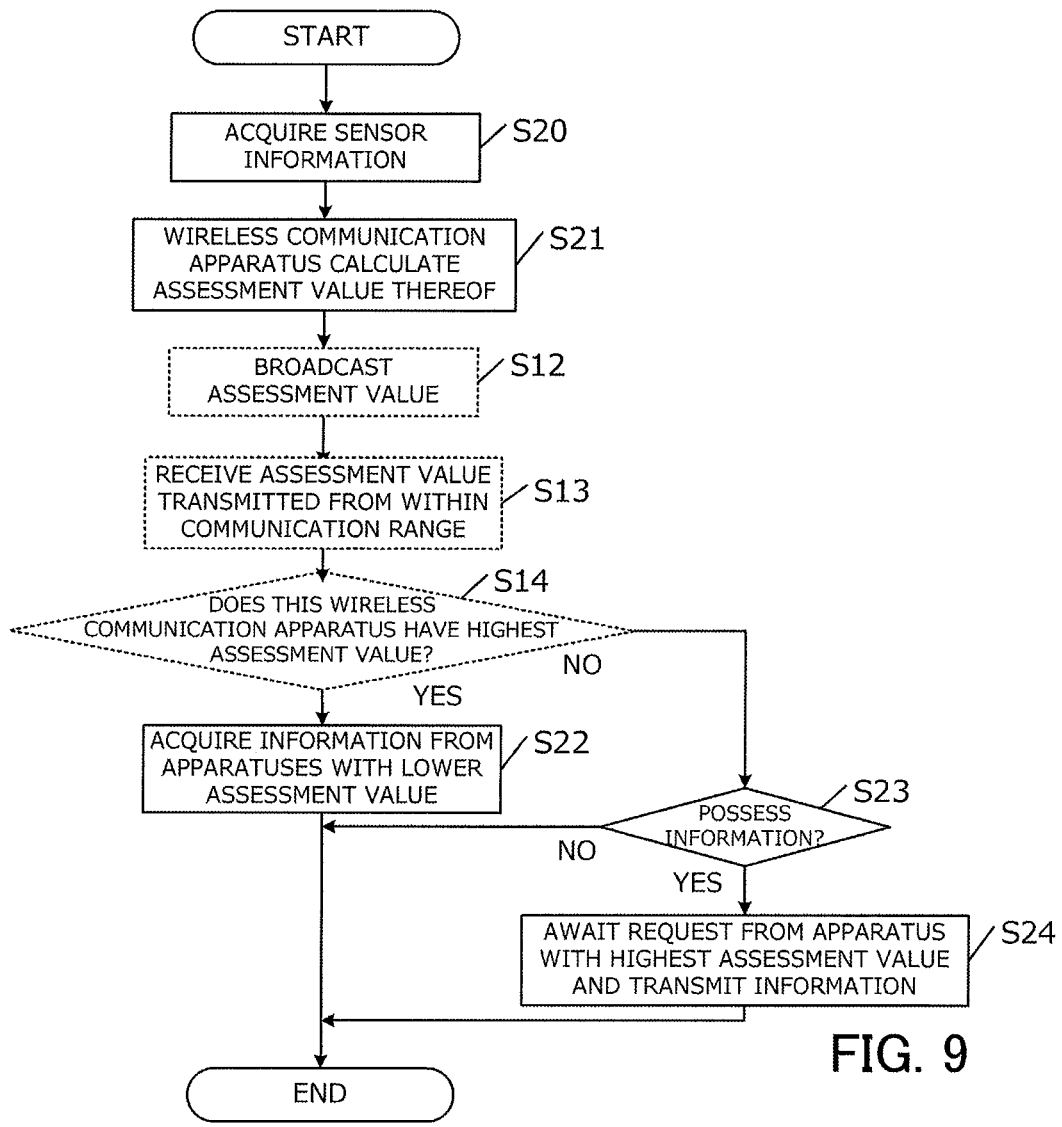
FIG. 9 is a flow chart of processes performed by the wireless communication apparatus 100 according to the second embodiment.

Since a configuration of the wireless communication apparatus 100 according to the second embodiment is similar to that shown in FIG. 2, a detailed description of the configuration will be omitted and only differences in processes performed by the respective units will be described. FIG. 9 is a flow chart of processes performed by the wireless communication apparatus 100 according to the second embodiment. Processes similar to those of the first embodiment will be depicted by dotted lines and a description thereof will be omitted.

In the second embodiment, the wireless communication apparatus 100 acquires information (information to be ultimately transmitted to the master node) from a sensor (not shown) provided in a vehicle (step S20). The acquired information is temporarily stored in a memory (not shown).

<Difference in Methods of Calculating Assessment Value>

The second embodiment differs from the first embodiment in a method (assessment value calculation criteria) used by the wireless communication apparatus 100 when calculating an assessment value in step S21.

When information is to be collected by a tree structure having a master node at an uppermost position, it can be estimated that the more communication opportunities a wireless communication apparatus has with the master node (or, the higher the probability of arrival of a communication opportunity of a wireless communication apparatus), the higher the position of the wireless communication apparatus in the tree structure.

In consideration thereof, in the second embodiment, in step S21, an assessment value based on communication opportunities is calculated using a positional relationship between a wireless communication apparatus and the master node.

Figure 10C:
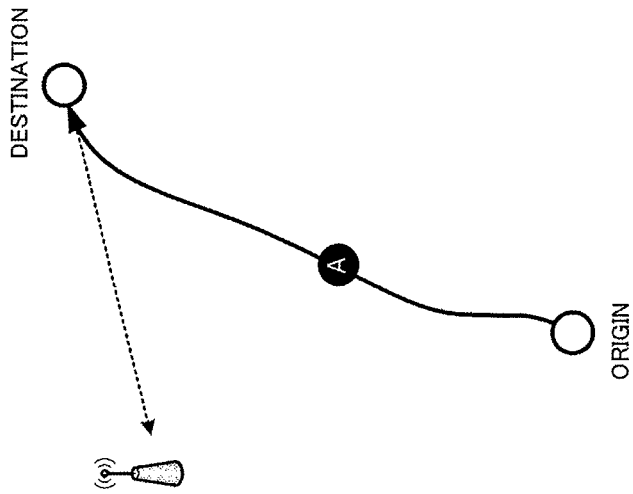
FIGS. 10A to 10C show an example of assessment value calculation criteria according to the second embodiment.

It can be estimated that the shorter the distance between a current position of the wireless communication apparatus 100 and the master node 10, the higher the probability of the wireless communication apparatus 100 and the master node 10 subsequently becoming capable of communicating with each other. Therefore, an assessment value can be calculated such that the shorter the distance, the higher the assessment value. For example, after acquiring a coordinate (latitude and longitude) corresponding to the current position of the wireless communication apparatus 100 and a coordinate (latitude and longitude) corresponding to the master node 10 and calculating a distance, an assessment value is calculated such that the shorter the distance, the higher the assessment value (FIG. 10A).

Moreover, as a modification, positional information other than a current position may be used.

Figure 10B:
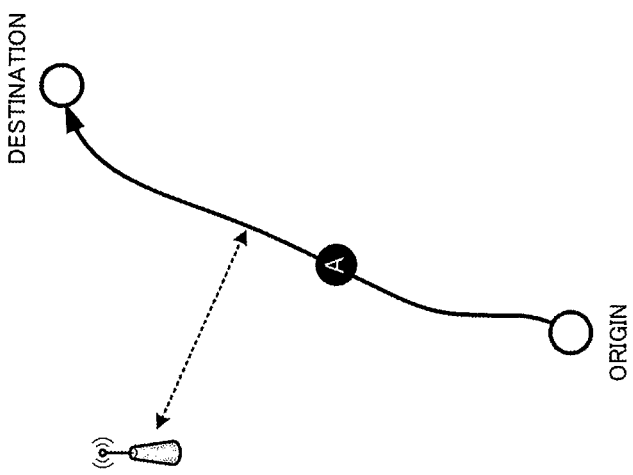
Figure 10A:
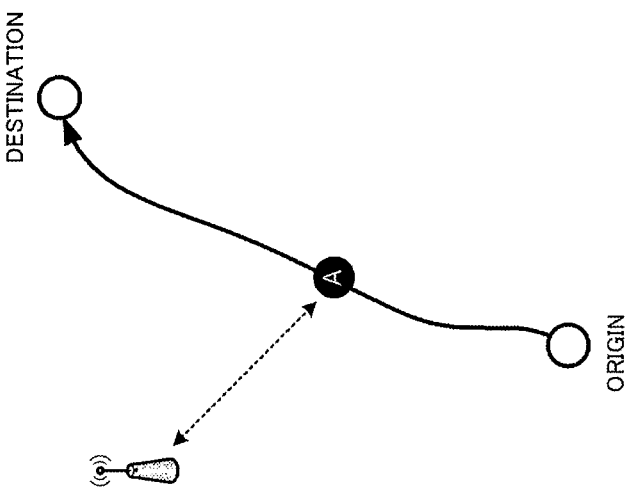

For example, when a travel route of a vehicle on which the wireless communication apparatus 100 is mounted can be acquired, an assessment value can be calculated such that the shorter a shortest distance (or an average distance) between a point on the travel route and the master node 10, the higher the assessment value (FIG. 10B).

In addition, the travel route need not necessarily be a route currently being traveled. For example, when past travel history of the vehicle can be acquired, a route on which the vehicle is likely to travel may be extracted from the history and an assessment value may be calculated using the extracted route.

Furthermore, when a destination of a vehicle on which the wireless communication apparatus 100 is mounted can be acquired, after comparing a coordinate corresponding to the destination with a coordinate corresponding to the master node 10 and calculating a distance, an assessment value can be calculated such that the shorter the distance, the higher the assessment value (FIG. 10C).

<Difference in Methods of Transmitting and Receiving Information>

In the second embodiment, when a wireless communication apparatus determines that the wireless communication apparatus itself is at the first position (in other words, at an upper position in the tree structure), this wireless communication apparatus collects information from a plurality of wireless communication apparatuses at the second position.

Information collected from the other apparatuses is temporarily stored in a memory (not shown) together with information acquired in step S20. Hereinafter, "information possessed" means that the information is stored in a memory.

In addition, in the second embodiment, when determining that the wireless communication apparatus itself is at the second position (in other words, at a lower position in the tree structure), this wireless communication apparatus transmits possessed information to the wireless communication apparatus at the first position.

In the present embodiment, an operation is performed in which an apparatus at the first position issues a connection request to apparatuses at the second position and collects information after the connection is completed.

In step S22, the wireless communication unit STA is controlled so that a wireless connection is established with the other apparatuses, and an information transmission request is transmitted after the connection is established. As a result, the information possessed by the wireless communication apparatuses at the second position is transmitted to the wireless communication apparatus at the first position.

Moreover, for example, a transmission request includes, but is not limited to, an identifier of the master node, a type, an area, a period, and a collection unit of the information requested, and various restrictions (a maximum number of transfers and a cutoff time).

On the other hand, in step S23, a determination is made on whether or not the information is being possessed, and if so, the wireless communication unit AP awaits a transmission request transmitted from another apparatus (a wireless communication apparatus with the highest assessment value or the master node). In addition, when the transmission request is received, the possessed information is transmitted (step S24).

According to steps S22 and S24, an information transmission request is transmitted from the wireless communication apparatus at the first position to the wireless communication apparatuses at the second position and, in response thereto, information is transmitted from the wireless communication apparatuses at the second position to the wireless communication apparatus at the first position.

Figure 6B:
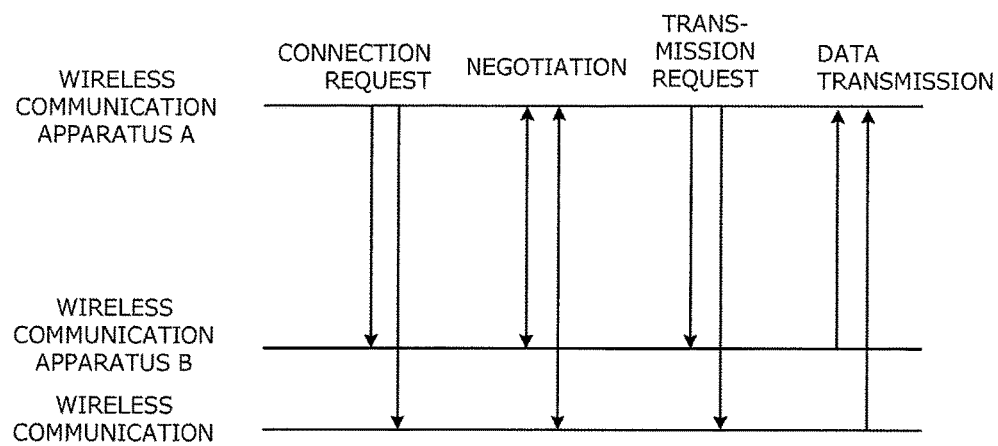

FIG. 6B is a sequence diagram showing communication between apparatuses. In FIG. 6B, it is assumed that the assessment value of the apparatus A is the highest in a similar manner to FIG. 6A.

First, the apparatus A respectively issues connection requests to the apparatuses B and C and negotiation is performed. Once connections are established, the apparatus A respectively transmits transmission requests to the apparatuses B and C and, in response thereto, information is transmitted from the apparatuses B and C to the apparatus A.

As described above, in the second embodiment, information is gradually gathered from apparatuses with low assessment values to an apparatus with a high assessment value. In other words, by appropriately setting assessment value calculation criteria, a collection route of information can be controlled.

Modification of Second Embodiment

In the second embodiment, an assessment value is determined based on distance. Examples of a method of determining an assessment value based on other than distance will now be described.

A first method is a method of determining an assessment value based on the time from a moment at which a wireless communication apparatus had last been capable of communicating with a master node. When there is a record of previous communications between the wireless communication apparatus 100 and the master node 10 and the time from a moment at which communication had last been enabled is short, it is estimated that the wireless communication apparatus is present in a periphery of the master node. Therefore, an assessment value can be calculated such that the shorter the time, the higher the assessment value.

A second method is a method of determining an assessment value based on a length of time during which a wireless communication apparatus and a master node have previously been capable of communicating with each other. It can be predicted that the greater the length of time during which the wireless communication apparatus 100 and the master node 10 have previously been capable of communicating with each other, the higher the probability of the wireless communication apparatus 100 and the master node 10 subsequently becoming capable of communicating with each other. Therefore, an assessment value can be calculated such that the longer the time, the higher the assessment value. Moreover, when there are a plurality of master nodes, the time during which communication can be performed may be a sum of all times.

Figure 11A:
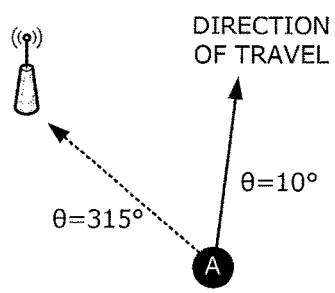
FIGS. 11A and 11B show an example of calculating an assessment value based on a movement direction.

A third method is a method of determining an assessment value based on a movement direction of a wireless communication apparatus. It can be estimated that the closer a direction (a first angle) in which a vehicle mounted with a wireless communication apparatus is headed is to a direction (a second angle) in which the master node 10 is present as viewed from the wireless communication apparatus, the greater a subsequent reduction in the distance between the wireless communication apparatus and the master node. Therefore, an assessment value can be calculated such that the smaller the difference between the first angle and the second angle, the higher the assessment value (FIG. 11A).

Figure 11B:
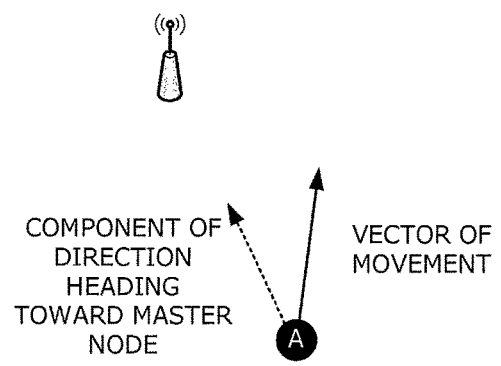

Alternatively, a component of a direction heading toward the master node may be calculated from a vector of movement of the wireless communication apparatus, in which case an assessment value can be calculated such that the larger the component, the higher the assessment value (FIG. 11B).

Moreover, an assessment value may be calculated by combining the methods exemplified above.

Third Embodiment

In the second embodiment, a single roadside apparatus is adopted as the master node 10. In contrast, a third embodiment is an embodiment in which a plurality of wireless communication apparatuses present within a specific area are all considered master nodes.

FIGS. 12A and 12B are diagrams showing an example of an area according to the third embodiment. FIG. 12A represents an example where a plurality of wireless communication apparatuses M within a given region (reference numeral 1101) are all considered master nodes. In addition, FIG. 12B represents an example where wireless communication apparatuses M along a given road (reference numeral 1102) are all considered master nodes.

The wireless communication apparatus 100 according to the third embodiment differs from that of the second embodiment in that, in step S21, an assessment value is calculated based on a shortest distance to an object area.

According to this embodiment, information can be communicated efficiently when an object to which the information desirably reaches is not a specific wireless communication apparatus but a wireless communication apparatus that is present within a given area.

Moreover, while a case where an assessment value is calculated using a shortest distance to an object area has been cited in the present example, an assessment value can be calculated using other methods such as those described earlier. For example, while an example in which an assessment value is calculated based on communication opportunities with a master node has been cited in the second embodiment, in the third embodiment, an assessment value may be calculated based on communication opportunities with a wireless communication apparatus positioned within a given area. Alternatively, an assessment value may be calculated using a positional relationship between a destination or a travel route and an object area.

Fourth Embodiment

A fourth embodiment is an embodiment in which the wireless communication apparatus 100 corrects a calculated assessment value.

In the first to third embodiments, the wireless communication apparatus 100 computes an assessment value such that the logically closer to a master node, the higher the assessment value. However, there may cases where, even when a wireless communication apparatus is positioned at a location near a master node, it is inappropriate to position the wireless communication apparatus at an upper position of a tree structure depending on a state of the wireless communication apparatus (or a state of a vehicle on which the wireless communication apparatus is mounted). Examples thereof include a case where performance for transferring information is insufficient.

A fourth embodiment is an embodiment in which, in order to accommodate such cases, the wireless communication apparatus 100 corrects an assessment value calculated based on attributes thereof.

In the fourth embodiment, following step S11 (or step S21), a step of correcting an assessment value is executed. The correction of an assessment value is performed based on communication performance of information. For example, when free capacity of a memory included in the wireless communication apparatus 100 is small, there is a possibility that information cannot be sufficiently communicated. In consideration thereof, when low information communication performance is estimated, a correction is performed to reduce an assessment value. For example, information communication performance can be estimated according to the following items.

(1) Free Memory Capacity of Wireless Communication Apparatus

When absolute free capacity (or relative free capacity) of a memory is small, since there is a possibility that information to be transferred cannot be stored, a correction which reduces an assessment value is performed.

(2) Time from Acquisition of Information

When the time between acquisition of information to be transferred and transmission of the information to another apparatus is long, a node is determined not suitable for communicating information and a correction which reduces an assessment value is performed.

(3) Movement Distance from Acquisition of Information

When the movement distance between acquisition of information to be transferred and transmission of the information to another apparatus is long, a node is determined not suitable for communicating information and a correction which reduces an assessment value is performed.

(4) Capacity or Speed of Communication Line

When communication bit rate is low, proactive transfer is discouraged by reducing an assessment value.

In addition to the above, a correction which reduces an assessment value may be performed when there is a factor which discourages proactively transferring information.

Conversely, when there is a factor which encourages proactively transferring information, a correction which increases an assessment value may be performed. For example, when free memory capacity of a wireless communication apparatus is large or when a high-speed communication line is available, a correction which increases an assessment value may be performed.

(Other Modifications)

The embodiments described above merely represent examples and the present invention can be implemented with various modifications without departing from the spirit and scope of the invention.

For example, while a wireless communication apparatus transmits or receives an assessment value and transmits or receives information that is a communication object after determining whether the wireless communication apparatus itself is on an upstream side or a downstream side of a master node in the description of the embodiments, the information that is a communication object may be received before an assessment value or may be received at the same time as an assessment value. For example, information transmitted from another apparatus may be received and temporarily stored, and handling of the information may be determined after receiving an assessment value. Alternatively, an assessment value may be received first and a determination may be made, and whether or not a main body of information is to be received may be subsequently determined.

In addition, while one type of information is set as a communication object in the description of the embodiments, a plurality of types of information may be communicated. In this case, in accordance with the properties of the information, different assessment value calculation criteria may be provided for each type. Specifically, an assessment value may be determined based on both a state or an attribute of a wireless communication apparatus itself and properties or an attribute of the information that is a communication object. According to this configuration, an optimum route can be generated in accordance with the information to be communicated.

Moreover, when the assessment value changes, relationships with surrounding wireless communication apparatuses also change. Therefore, the processes of FIG. 4 (FIG. 9) may be repetitively executed for each type of information to be communicated. As a result, a suitable communication route can be generated in accordance with properties of information.

What is claimed is:

1. A wireless communication apparatus which transfers information transmitted from a master node or information addressed to the master node, the wireless communication apparatus comprising:
    a memory; and
    a hardware processor programmed to:
        generate an assessment value representing logical proximity to the master node;
        transmit the generated assessment value to one or more other wireless communication apparatuses and receive assessment values from the one or more other wireless communication apparatuses by wireless communication;
        in a case where it is determined that the wireless communication apparatus is logically closest to the master node among wireless communication apparatuses within a communication-enabled range, based on the received assessment values:
            act as a wireless LAN client and issue a connection request to all of other wireless communication apparatuses within the communication-enabled range; and
            transmit information having the master node as a transmission source to the all of other wireless communication apparatuses, or receive information addressed to the master node from the all of other wireless communication apparatuses.

2. The wireless communication apparatus according to claim 1, wherein
    the assessment value increases as (i) a time until information transmitted from the master node reaches the wireless communication apparatus or (ii) a time until information transmitted from the wireless communication apparatus reaches the master node decreases.

3. The wireless communication apparatus according to claim 1, wherein:
    the hardware processor is programmed to acquire a current position; and
    the assessment value is determined based on (i) a frequency of communication opportunities between the wireless communication apparatus and the master node, or (ii) a time until a communication opportunity arrives, the frequency and the time being calculated based on the current position.

4. The wireless communication apparatus according to claim 3, wherein
    the assessment value is larger when the time until the communication opportunity between the wireless communication apparatus and the master node arrives is shorter as compared to when the time is longer.

5. The wireless communication apparatus according to claim 3, wherein
    the assessment value is larger when the time until the communication opportunity between the wireless communication apparatus and the master node arrives is predicted to subsequently become shorter as compared to when the time is predicted to subsequently become longer.

6. The wireless communication apparatus according to claim 1, wherein
    the hardware processor is programmed to:
        calculate the assessment value using respectively different criteria in accordance with a type of information to be transferred; and
        when information of a plurality of types is to be transferred, make a determination as to the logical proximity to the master node for each type of information to be transferred, by using an assessment value corresponding to the type of the information.

7. A wireless communication method in which a wireless communication apparatus which transfers information transmitted from a master node or information addressed to the master node executes the steps of:
    generating an assessment value representing logical proximity to the master node;
    transmitting the generated assessment value to one or more other wireless communication apparatuses and receiving assessment values from the one or more other wireless communication apparatuses by wireless communication;
    in a case where it is determined that the wireless communication apparatus is logically closest to the master node among wireless communication apparatuses within a communication-enabled range, based on the received assessment values:
        acting as a wireless LAN client and issuing a connection request to all of other wireless communication apparatuses within the communication-enabled range; and
        transmitting information having the master node as a transmission source to the all of other wireless communication apparatuses or receiving information addressed to the master node from the all of other wireless communication apparatuses.

8. A non-transitory computer readable storing medium recording a computer program for causing a computer, which is in a wireless communication apparatus that transfers information transmitted from a master node or information addressed to the master node, to perform:
    generating an assessment value representing logical proximity to the master node;

transmitting the generated assessment value to one or more other wireless communication apparatuses and receiving assessment values from the one or more other wireless communication apparatuses by wireless communication;

in a case where it is determined that the wireless communication apparatus is logically closest to the master node among wireless communication apparatuses within a communication-enabled range, based on the received assessment values:

acting as a wireless LAN client and issuing a connection request to all of other wireless communication apparatuses within the communication-enabled range; and transmitting information having the master node as a transmission source to the all of other wireless communication apparatuses or receiving information addressed to the master node from the all of other wireless communication apparatuses.

* * * * *